US010787073B2

(12) United States Patent
MacKenzie et al.

(10) Patent No.: US 10,787,073 B2
(45) Date of Patent: Sep. 29, 2020

(54) ELECTRIC DRIVE UNIT FOR VEHICLE WITH CLOCKABLE GEARBOX

(71) Applicant: FORD GLOBAL TECHNOLOGIES, LLC, Dearborn, MI (US)

(72) Inventors: Kevin MacKenzie, Canton, MI (US); Kyle Gary Mattinson, Saline, MI (US); Jude Berthault, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,579

(22) Filed: Dec. 11, 2018

(65) Prior Publication Data
US 2020/0180430 A1 Jun. 11, 2020

(51) Int. Cl.
B60K 1/00 (2006.01)
B60K 17/12 (2006.01)
B60K 1/02 (2006.01)
F16H 57/00 (2012.01)
F16H 57/02 (2012.01)

(52) U.S. Cl.
CPC ............. B60K 17/12 (2013.01); B60K 1/02 (2013.01); F16H 57/0018 (2013.01); F16H 57/02 (2013.01); F16H 2057/0056 (2013.01); F16H 2057/02034 (2013.01); F16H 2057/02043 (2013.01)

(58) Field of Classification Search
CPC .......... B60K 1/00; B60K 17/16; B60K 17/12; B60K 1/02; F16H 57/0424
See application file for complete search history.

(56) References Cited

U.S. PATENT DOCUMENTS

| 6,105,710 | A | 8/2000 | Vandepitte | |
|---|---|---|---|---|
| 6,864,607 | B2 * | 3/2005 | Hashimoto | ............... B60K 1/00 180/65.1 |
| 6,893,371 | B2 | 5/2005 | Mills et al. | |
| 7,739,005 | B1 * | 6/2010 | Tang | ......................... B60L 3/10 701/22 |
| 8,116,927 | B2 * | 2/2012 | Yu | .......................... B60K 6/442 701/22 |
| 8,641,568 | B2 * | 2/2014 | Knoblauch | ............... B60K 1/02 180/65.6 |
| 8,725,335 | B2 * | 5/2014 | Tolkacz | ................. B60W 10/06 701/22 |
| 9,278,618 | B2 * | 3/2016 | Valler | ..................... B60K 17/16 |
| 9,285,022 | B2 * | 3/2016 | Hadwani | ................ F16H 37/065 |
| 9,463,697 | B1 * | 10/2016 | Gauthier | .................. B60L 3/106 |
| 9,469,199 | B1 * | 10/2016 | Gauthier | .......... B60W 30/18172 |
| 9,856,971 | B2 * | 1/2018 | Mikami | ............... F16H 57/0424 |
| 2008/0230284 | A1 | 9/2008 | Schoon | |
| 2014/0087906 | A1 * | 3/2014 | Keeney | ..................... B60K 1/00 475/150 |
| 2017/0320367 | A1 * | 11/2017 | Milton | ..................... B60G 3/06 |
| 2017/0320381 | A1 * | 11/2017 | Milton | ..................... B60L 1/14 |

* cited by examiner

Primary Examiner — Hau V Phan
(74) Attorney, Agent, or Firm — David Kelley; Brooks Kushman, P.C.

(57) ABSTRACT

An electric drive system for a vehicle includes a motor housing and a gearbox housing that is mountable to the motor housing at a predetermined number of rotational positions.

19 Claims, 4 Drawing Sheets

ELECTRIC DRIVE UNIT FOR VEHICLE WITH CLOCKABLE GEARBOX

TECHNICAL FIELD

This application generally relates coupling an electric motor to a gearbox for an electric vehicle.

BACKGROUND

Electric vehicles utilize an electric drivetrain for propulsion. The electric drivetrain may be installed on the front or rear axles. Each placement has different packaging constraints. In the front of the vehicle, the steering rack, suspension, and cross members may influence the packaging and placement. In the rear of the vehicle, a low load floor or pickup bed may influence the packaging and placement. As such, the electric drivetrain is generally custom-designed for each application.

SUMMARY

An electric drive unit for a vehicle includes an electric machine including a motor housing. The electric drive unit further includes a gearbox including a housing that is configured to mount to the motor housing at a predetermined number of rotational positions such that the electric drive unit can be adapted to placement on one or more of a rear axle and a front axle by mounting the gearbox to the electric machine at one of the rotational positions.

The motor housing and the housing of the gearbox may define a common pattern of openings for coupling devices. The common pattern may be circular and a distance between adjacent openings may be equal for all of the adjacent openings. The motor housing may define a first pattern of openings at a first radial distance from a central axis and the housing for the gearbox may define a second pattern of openings at a second radial distance from the central axis. The second radial distance may be less than the first radial distance.

An electric vehicle includes two electric machines having same motor housings and two gearboxes having same gearbox housings, one coupled to a front axle and mounted to one of the motor housings at a first rotational position and another coupled to a rear axle and mounted to the other of the motor housings at a second rotational position different than the first rotational position.

The motor housings and the gearbox housings may define a pattern of openings for insertion of fasteners. The pattern may be circular and a distance between adjacent openings is equal for all adjacent openings. The electric vehicle may further include an adapter plate coupled between at least one of the motor housings and associated gearbox housing. The gearbox housings and the adapter plate may define a circular pattern of openings such that the openings are symmetric about a circumference. The motor housings and the adapter plate may define openings in a first pattern that is not symmetric about an axis and the openings may be aligned to connect the motor housings and the adapter plate. The adapter plate may be aligned to achieve one of the first rotational position and the second rotational position. The openings may be aligned to achieve one of the first rotational position and the second rotational position for coupling to one of the motor housings. The adapter plate may configured to align one of the gearbox housings to a corresponding one of the motor housings at a desired rotational position and the adapter plate may be different for each coupling.

An electric drive unit for a vehicle includes a motor housing defining a first pattern of openings about a central axis and a gearbox housing defining a second pattern of openings about the central axis. The electric drive unit further includes an adapter plate defining openings according to the first pattern and the second pattern and configured to attach the gearbox housing to the motor housing at a predetermined rotational position relative to the motor housing.

The second pattern may be circular and the openings may be equally spaced about a circumference. The openings of the second pattern may be at a first radial distance from the central axis and the openings of the first pattern may be at radial distances greater than the first radial distance. The predetermined rotational position may be defined by alignment of the first pattern relative to the gearbox housing. The adapter plate may be coupled to the gearbox housing via the second pattern of openings. The adapter plate may be configured to achieve the predetermined rotational position by aligning the second pattern of openings such that the first pattern of openings of the adapter plate aligns with the first pattern of openings of the motor housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
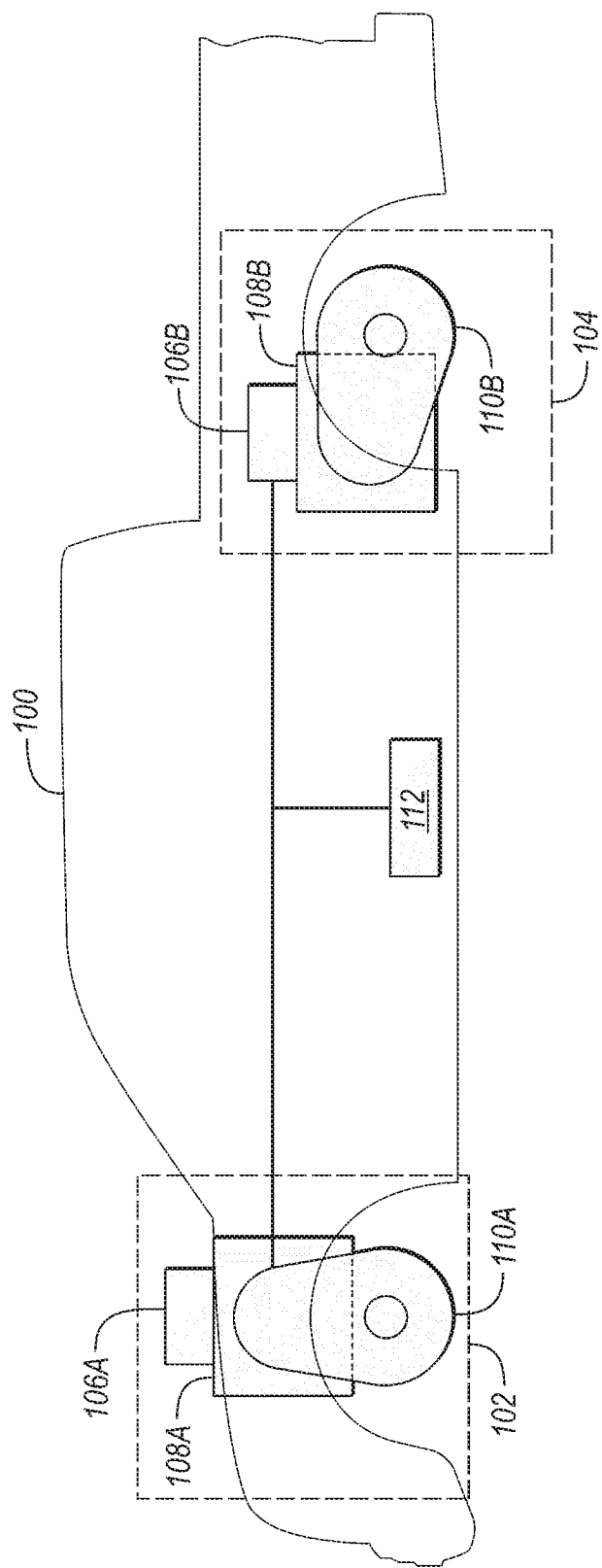
FIG. 1 depicts a possible configuration for an electrified vehicle.

FIG. 1 depicts an electric vehicle 100. The electric vehicle may comprise a first electric drive unit 102 and a second electric drive unit 104. The drive units are not necessary drawn to scale in the figure. Each of the electric drive units 102, 104, may include an electric machine 108, an inverter 106, and a gearbox 110. For example, the first electric drive unit 102 includes electric machine 108A, inverter 106A, and gearbox 110A. The second drive unit 104 include electric machine 108B, inverter 106B, and gearbox 110B.

The electric machine 108 may be capable of operating as a motor and a generator. The electric machine 108 may include a motor housing. For example, during vehicle propulsion, the electric machine 108 may be operated as a motor. During vehicle braking, the electric machine 108 may be operated as a generator to recover energy by decelerating the vehicle 100. The gearbox 110 may be configured to couple to a drive shaft for driving an associated axle or wheels. The gearbox 110 may include a gearbox housing. The gearbox 110 may include a differential function to adjust the speed of drive shafts attached to the wheels. In some configurations, the gearbox 110 may include multiple gears selected by one or more clutch elements.

The vehicle 100 may include a battery pack or traction battery 112 configured to store energy that can be used by the electric machine 108. The traction battery 112 may provide a high voltage direct current (DC) output to the inverter 106. The inverter 106 may be electrically coupled to the electric machine 108 and be configured to operate the electric machine 108. For example, the inverter 106 may operate the electric machine 108 to control a torque applied to the axle or wheels.

In the configuration shown, the first drive unit 102 is configured to operate a front axle or wheels and the second drive unit 104 is configured to operate the rear axle or wheels. The configuration depicted may be referred to as an all-wheel drive (AWD) or four-wheel drive (4WD) configuration. Other vehicle configurations may be driven by only a front electric drive unit (e.g., front-wheel drive (FWD) vehicle) or only by a rear electric drive unit (e.g., rear-wheel drive (RWD) vehicle).

In an AWD configuration, each axle may have different packaging constraints. For example, the front electric drive unit 102 may be affected by the steering rack, suspension, and cross members. The rear electric drive unit 104 may be affected by a load floor height or pickup bed. In practice, the front electric drive unit 102 and the rear axle drive unit 104 require different configurations to satisfy the packaging constraints. However, the different configurations drive costs to increase. The solution typically involves custom motor and gearbox housings to satisfy the packaging constraints. To reduce cost, it may be desirable to use the exact same or identical configuration of electric drive unit on each of the axles. Further, it may be desirable to use the same electric drive unit in other vehicle designs as well.

In some configurations, the electric machines 108 may have identical motor housings and the gearboxes 110 may have identical gearbox housings. One of the gearboxes may be coupled to a front axle and mounted to one of the motor housings at a first rotational position. Another gearbox may be coupled to a rear axle and mounted to another motor housing at a second rotational position different that the first rotational position.

Figure 2:
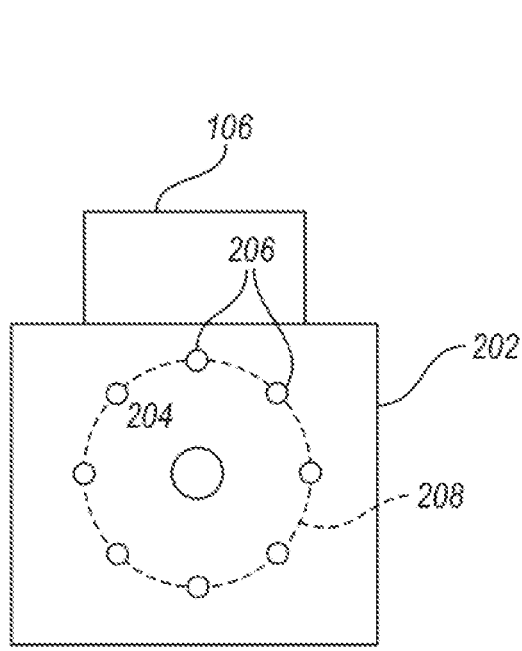
FIG. 2. depicts a possible mounting configuration for an electric motor housing.

FIG. 2 depicts a possible configuration for a motor housing 202. The motor housing 202 may house the electric machine components. The electric machine components may include windings, bearings, and shafts associated with the electric machine. The motor housing 202 may be configured to allow a motor shaft interface 204 to pass through a surface such that the motor shaft interface 204 is accessible. The motor shaft interface 204 may be a shaft with splines configured to mesh with a complementary interface of the gearbox. The motor shaft interface 204 may define a central axis that is aligned with the rotational axis of the electric machine. The motor housing 202 may further define a first predetermined number of apertures 206 that are configured to receive a fastening device. For example, the apertures 206 may be threaded to receive a bolt. In some configurations, the apertures 206 may be arranged in a first circular pattern 208. The first circular pattern 208 may be defined by a first radial distance from central axis defined by the motor shaft interface 204. The apertures 206 may be arranged such that a distance between adjacent apertures 206 is equal for each pair of adjacent apertures 206. The distance may be a circumferential distance. Although depicted as square or rectangular, the motor housing 202 may be alternatively shaped.

The motor housing 202 may also include attachment points for related components. The inverter 106 may be mounted to the motor housing 202. The motor housing 202 may include openings through which the inverter 106 may be electrically coupled to the windings of the electric machine. The motor housing 202 may include attachment points for coupling the motor housing 202 to a chassis of the vehicle 100.

Figure 3:
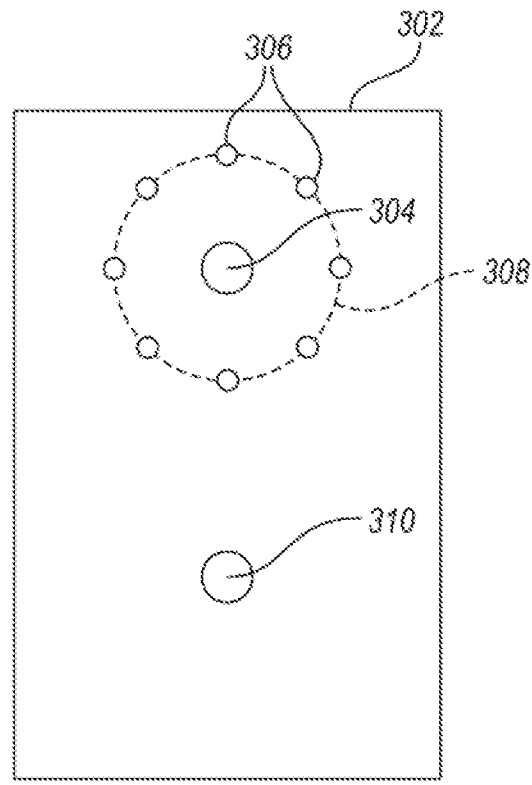
FIG. 3 depicts a possible mounting configuration for a gearbox.

FIG. 3 depicts a possible configuration for a gearbox housing 302. The gearbox housing 302 may enclose or contain the gearbox components. Although depicted as rectangular, the gearbox housing 302 may be alternatively shaped. The gearbox components may include shafts, bearings, gears, and clutches. The gearbox housing 302 may be configured to allow a gearbox input shaft interface 304 to pass through a surface of the gearbox housing 302. The gearbox input shaft interface 304 may be configured to couple to the motor shaft interface 204 to allow torque transfer from the electric machine to the gearbox. The gearbox housing 302 may be configured to allow a gearbox output shaft interface 310 to pass through a surface or surfaces of the gearbox housing 302. The gearbox output shaft interface 310 may be configured to attach to one or more drive shafts to transfer torque to the wheels of the vehicle 100.

The gearbox housing 302 may be configured to mount to the motor housing 202 at a predetermined number of rotational positions such that the electric drive system can be adapted to placement on one or more of a rear axle and a front axle by mounting the gearbox 110 to the electric machine 108 at one of the rotational positions. The gearbox housing 302 may define a second predetermined number of apertures 306 that are configured to allow a fastening device to pass through. In some configurations, the apertures 306 may be threaded to receive a bolt. The apertures 306 may be arranged in a second circular pattern 308. The gearbox housing 302 may include a flange or collar on which the apertures 306 are defined. The flange or collar may extend from the gearbox housing 302 such that fastening devices may be accessed to facilitated coupling with the motor housing 202.

The gearbox input shaft interface 304 may define a central axis that is aligned with the rotational axis of an input stage of the gearbox. The second circular pattern 308 may be defined by a second radial distance from the central axis defined by the gearbox input shaft interface 304. The apertures 306 may be arranged such that a distance (e.g., circumferential distance) between adjacent apertures 306 is equal for each pair of adjacent apertures 306.

The motor housing 202 and the gearbox housing 302 may define a common pattern of apertures or openings for receiving coupling devices or fasteners. The common pattern may be circular and the distance between adjacent openings or apertures may be equal for all of the adjacent openings. The motor housing apertures 206 and the gearbox housing apertures 306 may be configured to be align with one another. In some configurations, aligning any two motor housing apertures 206 with two of the gearbox housing apertures 306 results in alignment of all the apertures.

When coupled, the motor shaft interface 204 may engage with the gearbox input shaft interface 304. In this condition, the central axes defined by the motor shaft interface 204 and the gearbox input shaft interface 304 are aligned such that a single central axis results. In some configurations, the first radial distance may be equal to the second radial distance and the first predetermined number of motor housing apertures 206 may be equal to the second predetermined number of gearbox housing apertures 306. In some configurations, the first pattern 208 and the second pattern 308 are identical. The gearbox housing 302 may be fastened to the motor housing 202 by aligning the gearbox apertures 306 and the motor housing apertures 206 and inserting a fastener (e.g., bolt) through the apertures 306, 206. Torque may be applied to the fasteners to secure the housings together.

A characteristic of the above described configuration is that the gearbox housing 302 may be coupled to the motor housing 202 at a predetermined number of rotational positions. That is, the gearbox output shaft interface 310 may be positioned at different rotational positions relative to the motor shaft interface 204. As an analogy, the gearbox housing 302 may be arranged in a clock-like manner relative to the motor housing 202. When the motor housing apertures 206 and the gearbox housing apertures 306 are equally spaced, the gearbox housing 302 may be mounted to the motor housing 202 in a variety of rotational positions. In each achievable rotational position, the gearbox housing apertures 306 align with the motor housing apertures 206 to allow securing the housings together. The rotational position at which the gearbox housing 302 is mounted to the gearbox housing 302 may depend on packaging constraints of other vehicle components.

An advantage of the clockable gearbox housing 302 is that a common motor housing 202 and a common gearbox housing 302 may be used for a variety of vehicle applications. In addition, the motor housing 202 and the gearbox housing 302 may be used in the same vehicle on different axles. The motor housing 202 used on each axle may be identical. The gearbox housing 302 used on each axle may be identical. The difference may be that the gearbox housing 302 on each axle may be mounted to the motor housing 202 at a different rotational position. The use of identical components may reduce cost as the manufacturer need only manage a single part number. The configuration also provide flexibility for additional vehicle applications as the previously validated common components may be used in other applications with reduced validation effort.

Figure 4:
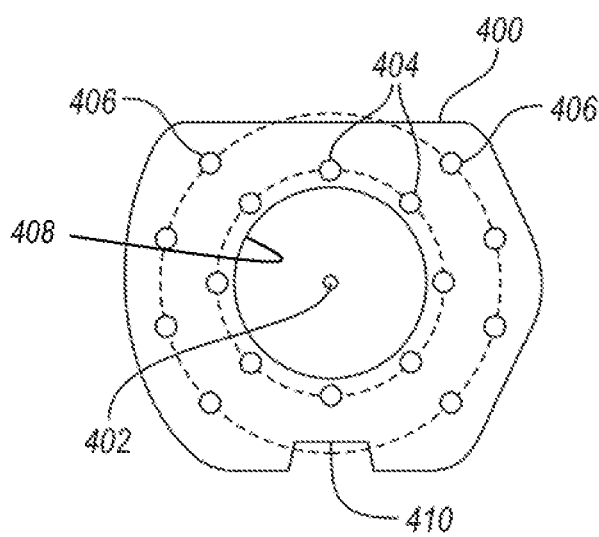
FIG. 4 depicts a possible adapter plate configuration.

An alternative configuration that achieves a similar result is possible. FIG. 4 depicts an adapter plate 400 that is configured to mount a gearbox housing to a motor housing. The adapter plate 400 may be constructed of metal of a predetermined thickness and strength. The adapter plate 400 may define a first set of apertures 404. The first set of apertures 404 may be configured to mount the adapter plate 400 to the gearbox housing 302. For example, the adapter plate 400 may be fastened (e.g., bolted) to the gearbox housing 302. In some configurations, each of the apertures of the first set of apertures 404 may be equally spaced from adjacent apertures. This allows the adapter plate 400 to be attached to the gearbox housing 302 at a predetermined number of rotational positions. The adapter plate 400 may define a circular pattern of openings 404 such that the openings 404 are symmetric about a circumference.

The adapter plate 400 may further define a second set of apertures 406 that are configured to mount the adapter plate 400 to the motor housing 202. The second set of apertures 406 may be configured to align with the motor housing apertures 206 when properly aligned. The second set of apertures 406 may be configured to mount the gearbox housing 302 to the motor housing 202 at a predetermined rotational position. The second set of apertures 406 may be defined as a pattern that is not symmetric about an axis.

The adapter plate 400 may define a central opening 408 that is configured to permit the motor shaft interface 204 to connect to the gearbox input shaft interface 304. The central opening 408 may be about a central axis 402. The central axis 402 may align with the axis defined by the motor shaft interface 204 and/or the gearbox input shaft interface 304. The first set of apertures 404 may be at a first radial distance from the central axis 402. The second set of apertures 406 may be at a second radial distance from the central axis 402. The first radial distance may be less than the second radial distance.

The adapter plate 400 may further define a notch 410 or similar feature on the outer circumference. The notch 410 may aid in aligning the adapter plate 400 to the gearbox housing 302 and/or the motor housing 202. For example, the notch 410 may align with a protrusion on the motor housing 202 to ensure that the housings are properly aligned. In other configurations, the notch 410 or similar feature may be defined on the inner circumference to align with a protrusion on the gearbox housing 302. In some configurations, there may be a notch 410 defined on both the inner circumference and the outer circumference.

The adapter plate 400 may be attached to the gearbox housing 302 by aligning the gearbox apertures 306 and the first set of apertures 404 of the adapter plate 400. The adapter plate 400 may be fastened to the gearbox housing 302. In some configurations, a gasket may be installed between surfaces of the gearbox housing 302 and the adapter plate 400. When coupled to the motor housing 302, these fasteners may not be externally visible. The adapter plate 400 and gearbox housing 302 may then be mounted to the motor housing 202 using the second set of apertures 406. The second set of apertures 406 may be aligned with the motor housing apertures 206. Fasteners may be inserted through the aligned apertures and secured. In some configurations, a gasket may be installed between surfaces of the motor housing 202 and the adapter plate 400.

Figure 5:
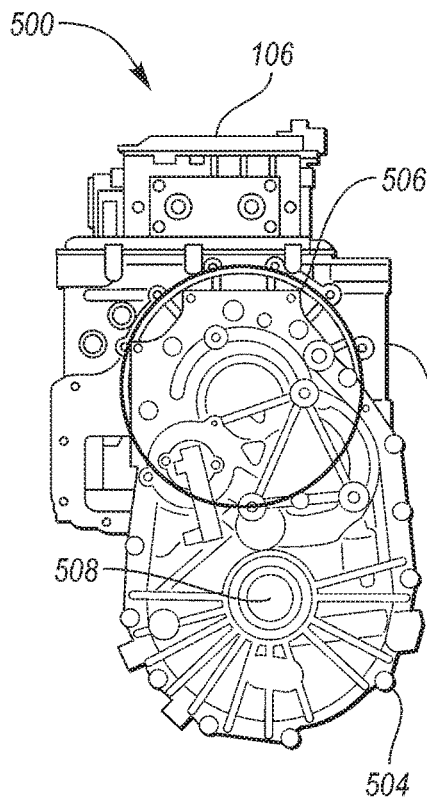
FIG. 5 depicts a motor coupled to a gearbox at a first rotational position.
Figure 6:
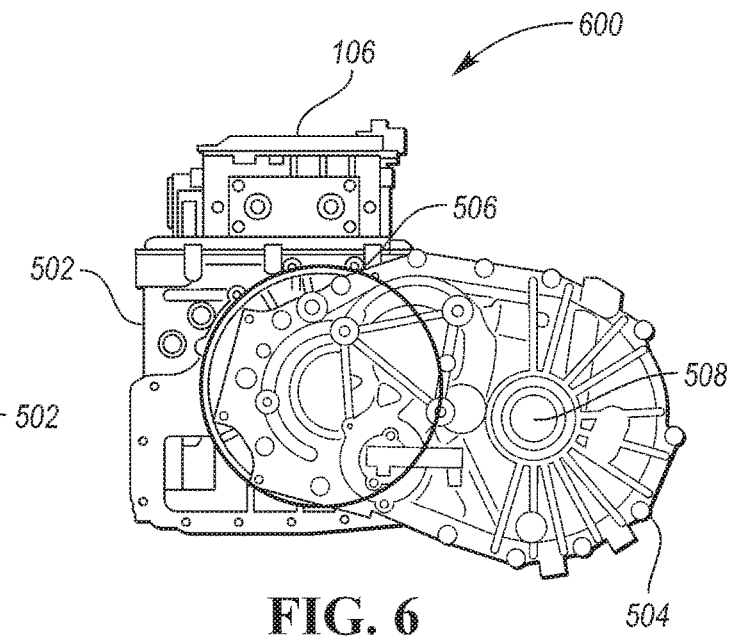
FIG. 6 depicts a motor coupled to a gearbox at a second rotational position.

FIG. 5 depicts an example of a first electric drive unit configuration 500 in which a gearbox is attached to a motor housing at a first rotational position. FIG. 6 depicts an example of a second electric drive unit configuration 600 in which the gearbox is attached to the motor housing at a second rotational position. The first electric drive unit configuration 500 includes a motor housing 502. The inverter module 106 is attached to the motor housing 502. The gearbox 504 is attached to the motor housing 502 at a first rotational position. The first rotational position may be such that a drive shaft interface 508 is at a vertical position below the motor housing 502.

The second electric drive unit configuration 600 includes the motor housing 502. The inverter module 106 is attached to the motor housing 502. The gearbox 504 is attached to the motor housing 502 at a second rotational position. The second rotational position may be such that the drive shaft interface 508 is at a horizontal position on a side of the motor housing 502.

Figure 7:
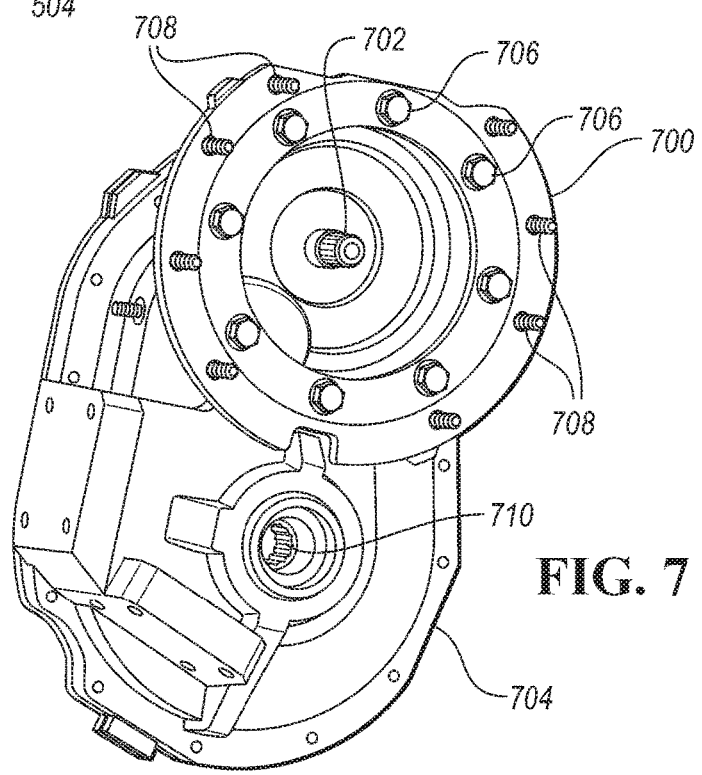
FIG. 7 depicts an adapter plate coupled to a gearbox.

FIG. 7 depicts an adapter plate 700 that is attached to a gearbox housing 704. The adapter plate 700 may be attached to the gearbox housing 704 using a first set of fasteners 706 that pass through the aligned apertures of the adapter plate 700 and the gearbox housing 704. The apertures defined by the gearbox housing 704 may be threaded to allow the fastener to thread into the aperture to secure the components together. The adapter plate 700 may define additional apertures through which a second set of fasteners 708 may be inserted in corresponding apertures of the adapter plate 700 to secure the adapter plate 700 to a motor housing. The adapter plate 700 may define an opening about a gearbox input shaft interface 702. A driveshaft interface 710 may also be defined by the gearbox.

Figure 8:
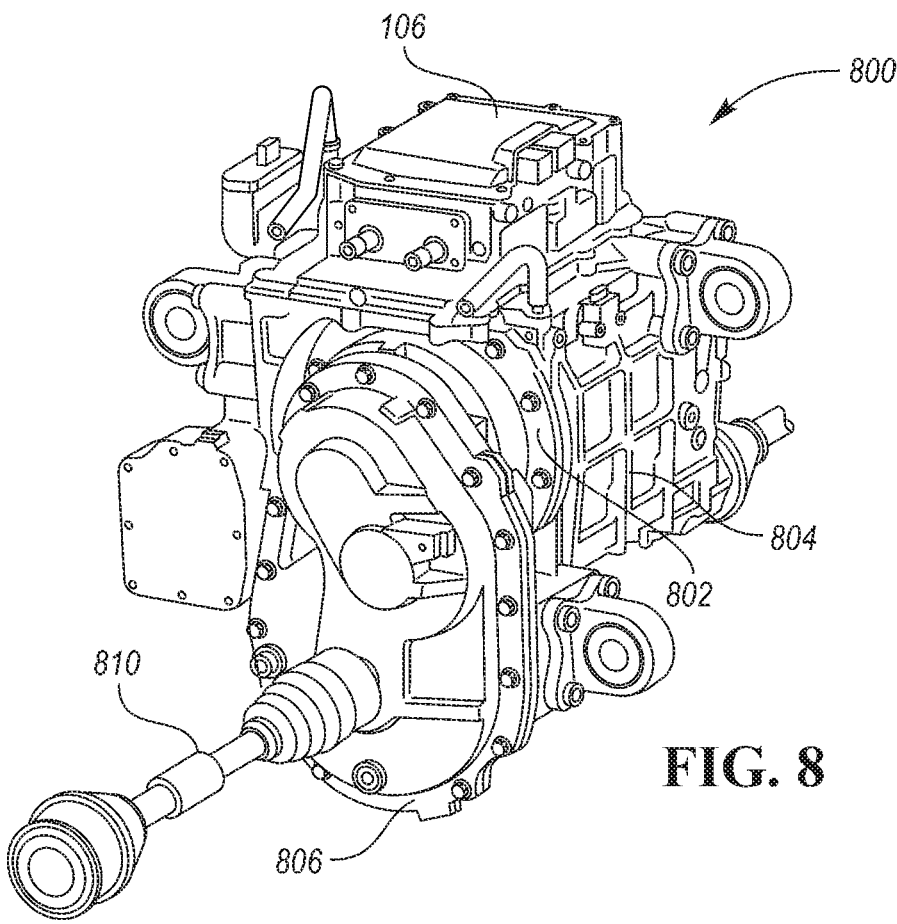
FIG. 8 depicts a motor coupled to a gearbox at a first rotational position using an adapter plate.
Figure 9:
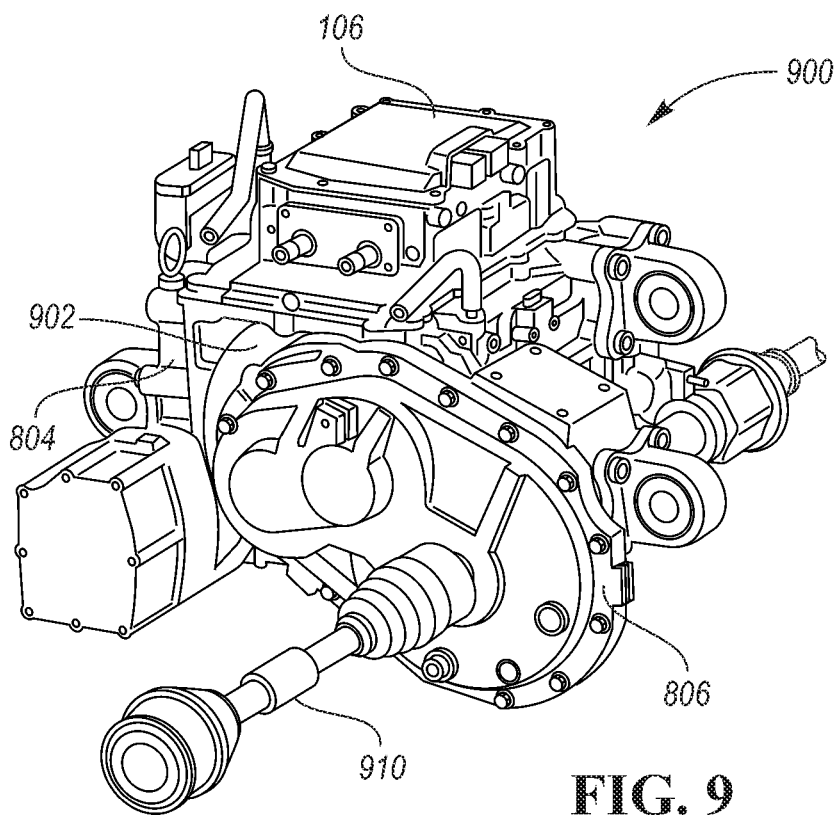
FIG. 9 depicts a motor coupled to a gearbox at a second rotational position using an adapter plate.

FIG. 8 depicts an example of third electric drive unit configuration 800 in which a gearbox is attached to a motor housing 804 at a first rotational position using a first adapter plate 802. FIG. 9 depicts an example of a fourth electric drive unit configuration 900 in which the gearbox is attached to the motor housing 804 at a second rotational position using a second adapter plate 902. The third electric drive unit configuration 800 includes a motor housing 804. The inverter module 106 is attached to the motor housing 804. The gearbox 806 is attached to the motor housing 804 at a first rotational position. The first rotational position may be such that a drive shaft 810 extends from the gearbox 806 at a vertical position below the motor housing 804. The first adapter plate 802 may be configured to attach to the gearbox 806. The gearbox 806 may then be coupled to the motor housing 804 by aligning the apertures of the first adapter plate 802 to matching apertures in the motor housing 804 and inserting fasteners.

The fourth electric drive unit configuration 900 includes the motor housing 804. The inverter module 106 is attached to the motor housing 804. The gearbox 806 is attached to the motor housing 804 at a second rotational position. The second rotational position may be such that a drive shaft 910 extends from the gearbox 806 at a position to a side of the motor housing 804. The second adapter plate 902 may be configured to attach to the gearbox 806. The gearbox 806 may then be coupled to the motor housing 804 by aligning the apertures of the second adapter plate 902 to matching apertures in the motor housing 804 and inserting fasteners.

In some configurations, the first adapter plate 802 and the second adapter plate 902 may be identically configured (e.g., common adapter plate). Rotational positioning of the drive shaft 810, 910 relative to the motor housing 804 may be achieved by alignment of the common adapter plate when coupling to the gearbox 806. The common adapter plate may have a symmetric arrangement of apertures for coupling to the gearbox 806. This allows the apertures for mounting to the motor housing 804 to be rotated to a number of rotational positions relative to the central axis.

The clockable gearbox arrangement permits the use of a common motor housing and gearbox housing for a variety of vehicle applications. This allows the use of common components in a vehicle and across vehicle platforms. This eliminates additional validation effort that would be necessary when designing new components for each application.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric drive unit for a vehicle comprising:
an electric machine including a motor housing; and
a gearbox including a drive shaft interface that is offset from a gearbox input shaft and a housing that is configured to mount to the motor housing such that the drive shaft interface can be positioned at any one of a plurality of rotational positions relative to the motor housing by rotating the housing relative to the motor housing, wherein the plurality of rotational positions are defined by a pattern of openings that are defined by the motor housing and the housing for receiving coupling devices that attach the housing to the motor housing.

2. The electric drive unit of claim 1 wherein the motor housing and the housing of the gearbox define a common pattern of openings for coupling devices.

3. The electric drive unit of claim 2 wherein the common pattern is circular and a distance between adjacent openings is equal for all of the adjacent openings.

4. The electric drive unit of claim 1 wherein the motor housing defines a first pattern of openings at a first radial distance from a central axis and the housing for the gearbox defines a second pattern of openings at a second radial distance from the central axis.

5. The electric drive unit of claim 4 wherein the second radial distance is less than the first radial distance.

6. An electric vehicle comprising:
two electric machines having separate identically configured motor housings; and
two gearboxes having separate identically configured gearbox housings, one coupled to a front axle and mounted to one of the motor housings such that a front axle drive shaft interface is at a first rotational position relative to the one of the motor housings and another coupled to a rear axle and mounted to the other of the motor housings such that a rear axle drive shaft interface is at a second rotational position relative to the other of the motor housings, wherein the second rotational position is different than the first rotational position, wherein the motor housings and the gearbox housings define a pattern of openings for insertion of fasteners.

7. The electric vehicle of claim 6 wherein the pattern is circular and a distance between adjacent openings is equal for all adjacent openings.

8. The electric vehicle of claim 6 further comprising an adapter plate coupled between at least one of the motor housings and associated gearbox housing.

9. The electric vehicle of claim 8 wherein the gearbox housings and the adapter plate define a circular pattern of openings such that the openings are symmetric about a circumference.

10. The electric vehicle of claim 9 wherein the motor housings and the adapter plate define openings in a first pattern that is not symmetric about an axis and the openings are aligned to connect the motor housings and the adapter plate.

11. The electric vehicle of claim 10 wherein the adapter plate is aligned to achieve one of the first rotational position and the second rotational position.

12. The electric vehicle of claim 9 wherein the openings are aligned to achieve one of the first rotational position and the second rotational position for coupling to one of the motor housings.

13. The electric vehicle of claim 9 wherein the adapter plate is configured to align one of the gearbox housings to a corresponding one of the motor housings at a desired rotational position, wherein the adapter plate is different for each coupling.

14. An electric drive unit for a vehicle comprising:
a motor housing defining, a first pattern of openings about a motor shaft that defines a central axis;
a gearbox housing, defining a second pattern of openings about a gearbox input shaft interface and having an output shaft interface that is offset from the gearbox input shaft interface; and
an adapter plate defining openings according to the first pattern and the second pattern and configured to attach the gearbox housing to the motor housing such that the motor shaft and the gearbox input shaft interface are aligned and the output shaft interface is positioned at a predetermined rotational position relative to the motor housing.

15. The electric drive unit of claim 14 wherein the second pattern is circular and the openings are equally spaced about a circumference.

16. The electric drive unit of claim 14 wherein the openings of the second pattern are at a first radial distance from the central axis and the openings of the first pattern are at radial distances greater than the first radial distance.

17. The electric drive unit of claim 14 wherein the predetermined rotational position is defined by alignment of the first pattern relative to the gearbox housing.

18. The electric drive unit of claim 14 wherein the adapter plate is coupled to the gearbox housing via the second pattern of openings.

19. The electric drive unit of claim 14 wherein the adapter plate is configured to achieve the predetermined rotational position by aligning the second pattern of openings such that the first pattern of openings of the adapter plate aligns with the first pattern of openings of the motor housing.

\* \* \* \* \*